US012799278B2

(12) United States Patent
Fujita

(10) Patent No.: US 12,799,278 B2
(45) Date of Patent: Nov. 17, 2026

(54) FURANYL GROUP-CONTAINING ORGANOPOLYSILOXANE AND PRODUCTION METHOD THEREOF

(71) Applicant: Shin-Etsu Chemical Co., Ltd., Tokyo (JP)

(72) Inventor: Shoji Fujita, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 490 days.

(21) Appl. No.: 18/569,125

(22) PCT Filed: Jun. 7, 2022

(86) PCT No.: PCT/JP2022/022875
§ 371 (c)(1),
(2) Date: Dec. 11, 2023

(87) PCT Pub. No.: WO2022/264866
PCT Pub. Date: Dec. 22, 2022

(65) Prior Publication Data

US 2024/0301143 A1 Sep. 12, 2024

(30) Foreign Application Priority Data

Jun. 16, 2021 (JP) ................................ 2021-099905

(51) Int. Cl.
*C08G 77/14* (2006.01)
*B01J 23/46* (2006.01)
*C08G 77/00* (2006.01)

(52) U.S. Cl.
CPC ............ *C08G 77/14* (2013.01); *B01J 23/468* (2013.01); *C08G 77/70* (2013.01)

(58) Field of Classification Search
None
See application file for complete search history.

(56) References Cited

U.S. PATENT DOCUMENTS

| | | | |
|---|---|---|---|
| 4,172,806 | A | 10/1979 | Vincent |
| 4,656,235 | A | 4/1987 | Tesoro et al. |
| 5,693,734 | A | 12/1997 | Herzig et al. |
| 2019/0077100 | A1 | 3/2019 | Li et al. |

FOREIGN PATENT DOCUMENTS

| | | | |
|---|---|---|---|
| CA | 2303999 | A1 * | 3/1999 |
| JP | 54-114800 | A | 9/1979 |
| JP | 8-67753 | A | 3/1996 |
| JP | 8-119977 | A | 5/1996 |
| JP | 4394238 | B2 * | 1/2010 |
| JP | 2018-535304 | A | 11/2018 |
| WO | WO 2015/098072 | A1 * | 7/2015 |

OTHER PUBLICATIONS

International Search Report for PCT/JP2022/022875 mailed on Aug. 9, 2022.

* cited by examiner

*Primary Examiner* — Tae H Yoon
(74) *Attorney, Agent, or Firm* — Birch, Stewart, Kolasch & Birch, LLP

(57) ABSTRACT

Provided are a furanyl group-containing organopolysiloxane that is flexible due to (poly)siloxane and contains furanyl groups having photocrosslinkability. The furanyl group-containing organopolysiloxane is represented by the following average composition formula (1), and has a number average molecular weight of 500 to 40,000, (1)

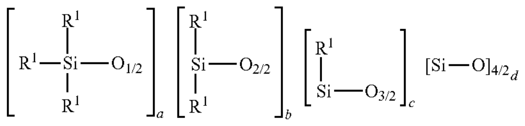

wherein $R^1$ represents a monovalent hydrocarbon group, etc., or a furanyl group expressed by the following general formula (2) or (3), in which at least one $R^1$ per molecule is the furanyl group expressed by the following general formula (2) or (3); a is a number of not smaller than 2, b is a number of not smaller than 0, c is a number of not smaller than 0, d is a number of not smaller than 0, and a, b, c and d satisfy $2 \leq a+b+c+d \leq 1{,}000$, (2)

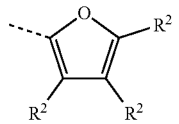

(3)

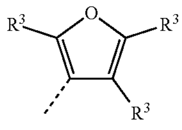

wherein $R^2$ or $R^3$ represents a hydrogen atom, or a monovalent hydrocarbon group, etc.; the broken lines represent bonds.

6 Claims, No Drawings

FURANYL GROUP-CONTAINING ORGANOPOLYSILOXANE AND PRODUCTION METHOD THEREOF

TECHNICAL FIELD

The present invention relates to a furanyl group-containing organopolysiloxane and a production method thereof.

BACKGROUND ART

Since a furanyl group-containing organopolysiloxane is a polymer having not only a flexibility attributed to (poly) siloxane, but also a cationic polymerizability and Diels-Alder reactivity that are attributed to furanyl group, it is expected to be used for purposes such as a coating agent, a resin modifier, and a self-restoring material.

As a method for producing a furanyl group-containing organopolysiloxane with a carbon atom- and/or oxygen atom-containing linker being present between the furanyl group and silicon atom, there is disclosed a method using an unsaturated bond-containing furanyl compound and a hydrosilyl group-containing organopolysiloxane (Patent document 1).

As a method for producing a furanyl group-containing organopolysiloxane in which a carbon atom of a furan ring is directly bonded to a silicon atom of an organosiloxane, there is disclosed a method using furanyl lithium, cyclotrisiloxane, and triorganohalosilane (Patent document 2); however, this method is limited to the production of a compound with an asymmetric siloxane structure. Further, other problems with this method are, for example, that a high-risk organic lithium species is used, and that it is critical to employ a filtration step of filtrating away the halogenated lithium after the reaction is over.

PRIOR ART DOCUMENTS

Patent Documents

Patent document 1: JP-A-Hei 8-67753
Patent document 2: JP-A-Hei 8-119977

SUMMARY OF THE INVENTION

Problems to be Solved by the Invention

Thus, it is an object of the present invention to provide a furanyl group-containing organopolysiloxane in which carbon atoms of furan rings are directly bonded to silicon atoms or an organopolysiloxane; and a production method of such furanyl group-containing organopolysiloxane that is capable of solving the abovementioned problems.

Means to Solve the Problems

The inventor of the present invention diligently conducted a series of studies to solve the above problems and completed the invention as follows. That is, the inventor found that by utilizing an iridium complex and a hydrogen acceptor, a furanyl group-containing organopolysiloxane was able to be safely and directly synthesized without yielding a metal salt as a byproduct via an oxidative coupling reaction between a furan compound and a hydrosilyl group-containing organopolysiloxane.

Specifically, the present invention is to provide the following furanyl group-containing organopolysiloxane and a production method thereof.

<1>

A furanyl group-containing organopolysiloxane that is represented by the following average composition formula (1), and has a number average molecular weight of 500 to 40,000,

[Chemical formula 1]

(1)

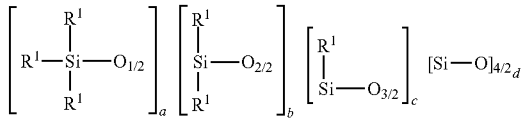

wherein each $R^1$ independently represents a group selected from a hydrogen atom, a monovalent hydrocarbon group having 1 to 10 carbon atoms, an alkoxy group having 1 to 4 carbon atoms, a hydroxyl group, and a furanyl group expressed by the following general formula (2) or (3), in which at least one $R^1$ per molecule is the furanyl group expressed by the following general formula (2) or (3); a is a number of not smaller than 2, b is a number of not smaller than 0, c is a number of not smaller than 0, d is a number of not smaller than 0, and a, b, c and d satisfy $2 \leq a+b+c+d \leq 1{,}000$,

[Chemical formula 2]

(2)

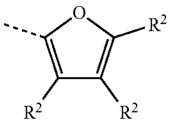

(3)

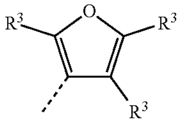

wherein each $R^2$ independently represents a group selected from a hydrogen atom, a halogen atom, a monovalent hydrocarbon group having 1 to 10 carbon atoms, an alkoxy group having 1 to 4 carbon atoms, and a hydroxyl group; each $R^3$ independently represents a group selected from a hydrogen atom, a halogen atom, a monovalent hydrocarbon group having 1 to 10 carbon atoms, an alkoxy group having 1 to 4 carbon atoms, and a hydroxyl group; the broken lines represent bonds.

<2>

The furanyl group-containing organopolysiloxane according to <1>, wherein the furanyl group-containing organopolysiloxane has a number average molecular weight of 1,000 to 20,000.

<3>

The furanyl group-containing organopolysiloxane according to <1> or <2>, wherein d in the formula (1) is 0.

<4>

The furanyl group-containing organopolysiloxane according to <3>, wherein even c in the formula (1) is 0.

<5>

A method for producing the furanyl group-containing organopolysiloxane according to any one of <1> to <4>, comprising a step of reacting (A) a furan compound represented by the following general formula (4) and (B) a hydrosilyl group-containing organopolysiloxane represented by the following average composition formula (5) under the presence of an iridium complex and a hydrogen acceptor,

[Chemical formula 3]

(4)

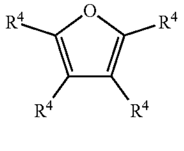

wherein each $R^4$ independently represents a group selected from a hydrogen atom, a halogen atom, a monovalent hydrocarbon group having 1 to 10 carbon atoms, an alkoxy group having 1 to 4 carbon atoms, and a hydroxyl group, in which at least one $R^4$ per molecule is a hydrogen atom,

[Chemical formula 4]

(5)

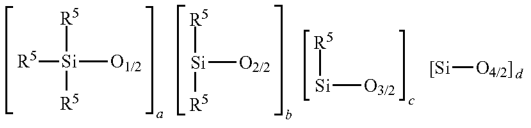

wherein each $R^5$ independently represents a group selected from a hydrogen atom, a monovalent hydrocarbon group having 1 to 10 carbon atoms, an alkoxy group having 1 to 4 carbon atoms, and a hydroxyl group, in which at least one $R^5$ per molecule is a hydrogen atom; a is a number of not smaller than 2, b is a number of not smaller than 0, c is a number of not smaller than 0, d is a number of not smaller than 0, and a, b, c and d satisfy $2 \le a+b+c+d \le 1{,}000$.

<6>

The method according to <5> for producing the furanyl group-containing organopolysiloxane, wherein the iridium complex is a complex whose ligands are at least one compound selected from the group consisting of: an aromatic hydrocarbon compound that has 6 to 30 carbon atoms; a hetero ring compound that has 2 to 30 carbon atoms; a hydrocarbon compound that contains a nitrogen-containing functional group, and has 1 to 30 carbon atoms; a hydrocarbon compound that contains an oxygen-containing functional group, and has 1 to 30 carbon atoms; a hydrocarbon compound that contains a sulfur-containing functional group, and has 1 to 30 carbon atoms; and a hydrocarbon compound that contains a phosphorus-containing functional group, and has 1 to 30 carbon atoms.

<7>

The method according to <5> or <6> for producing the furanyl group-containing organopolysiloxane, wherein the iridium complex is a hetero ring compound that has 2 to 30 carbon atoms, or a hydrocarbon compound that contains a phosphorus-containing functional group and has 1 to 30 carbon atoms.

<8>

The method according to any one of <5> to <7> for producing the furanyl group-containing organopolysiloxane, wherein the hydrogen acceptor is a carbon-carbon unsaturated bond-containing aliphatic hydrocarbon compound that has 2 to 20 carbon atoms.

Effects of the Invention

The furanyl group-containing organopolysiloxane of the present invention can be produced using materials that are relatively simple and easily obtainable, such as furan and a hydrosilyl group-containing organopolysiloxane. Further, this furanyl group-containing organopolysiloxane can be safely produced without yielding a metal salt as a byproduct.

Moreover, since the furanyl group-containing organopolysiloxane of the present invention is a polymer having not only a flexibility attributed to (poly)siloxane, but also a cationic polymerizability and Diels-Alder reactivity that are attributed to furanyl group, the furanyl group-containing organopolysiloxane of the present invention is useful for purposes such as a coating agent, a resin modifier, and a self-restoring material. Interestingly, in a cationic polymerization reaction using an acid catalyst, the furanyl group-containing organopolysiloxane of the present invention exhibited a significantly higher reactivity as compared to a furanyl group-containing organopolysiloxane having a carbon atom- and/or oxygen atom-containing linker between the furanyl group and silicon atom.

MODE FOR CARRYING OUT THE INVENTION

The present invention is described in detail hereunder.

[Furanyl Group-Containing Organopolysiloxane]

A furanyl group-containing organopolysiloxane of the present invention is represented by the following average composition formula (1).

[Chemical formula 5]

(1)

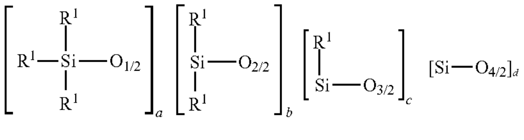

In the formula (1), each $R^1$ independently represents a group selected from a hydrogen atom, a monovalent hydrocarbon group having 1 to 10 carbon atoms, an alkoxy group having 1 to 4 carbon atoms, a hydroxyl group, and a furanyl group expressed by the following general formula (2) or (3), in which at least one $R^1$ per molecule is the furanyl group expressed by the following general formula (2) or (3). a is a number of not smaller than 2, b is a number of not smaller than 0, c is a number of not smaller than 0, d is a number of not smaller than 0, and a, b, c and d satisfy $2 \le a+b+c+d \le 1{,}000$.

[Chemical formula 6]

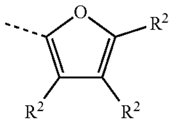

(2)

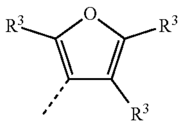

(3)

In the formulae (2) and (3), each $R^2$ independently represents a group selected from a hydrogen atom, a halogen atom, a monovalent hydrocarbon group having 1 to 10 carbon atoms, an alkoxy group having 1 to 4 carbon atoms, and a hydroxyl group; each $R^3$ independently represents a group selected from a hydrogen atom, a halogen atom, a monovalent hydrocarbon group having 1 to 10 carbon atoms, an alkoxy group having 1 to 4 carbon atoms, and a hydroxyl group. The broken lines represent bonds.

In the formula (1), $R^1$ represents a hydrogen atom, a monovalent hydrocarbon group having 1 to 10 carbon atoms, an alkoxy group having 1 to 4 carbon atoms, a hydroxyl group, or a furanyl group expressed by the general formula (2) or (3). In the formula (1), examples of the monovalent hydrocarbon group having 1 to 10 carbon atoms, which is represented by $R^1$, include an alkyl group such as a methyl group, an ethyl group, a propyl group, and a butyl group; a cycloalkyl group such as a cyclopentyl group and a cyclohexyl group; and an aryl group such as a phenyl group and a tolyl group. Examples of the alkoxy group having 1 to 4 carbon atoms, which is also represented by $R^1$, include a methoxy group, an ethoxy group, a propoxy group, and a butoxy group.

As for a group other than the furanyl group expressed by the general formula (2) or (3), $R^1$ is preferably an alkyl group, a cycloalkyl group, and an aryl group, of which a methyl group and a phenyl group are more preferred.

In the general formulae (2) and (3), $R^2$ and $R^3$ each represent a group selected from a hydrogen atom, a halogen atom, a monovalent hydrocarbon group having 1 to 10 carbon atoms, an alkoxy group having 1 to 4 carbon atoms, and a hydroxyl group. In the general formula (2) or (3), examples of the halogen atom represented by $R^2$ or $R^3$ include a fluorine atom, a chlorine atom, a bromine atom, and an iodine atom. Examples of the monovalent hydrocarbon group having 1 to 10 carbon atoms, which is also represented by $R^2$ or $R^3$, include an alkyl group such as a methyl group, an ethyl group, a propyl group, and a butyl group; a cycloalkyl group such as a cyclopentyl group and a cyclohexyl group; and an aryl group such as a phenyl group and a tolyl group. Examples of the alkoxy group having 1 to 4 carbon atoms, which is also represented by $R^2$ or $R^3$, include a methoxy group, an ethoxy group, a propoxy group, and a butoxy group. Among them, as $R^2$ and $R^3$, preferred are a hydrogen atom and an alkyl group.

Specific structures of the general formulae (2) and (3) may include, but are not limited to those shown below.

[Chemical formula 7]

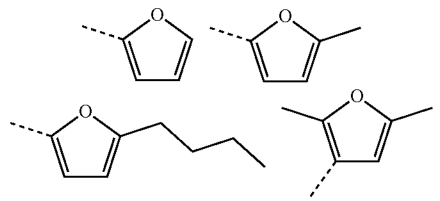

(In the above formulae, broken lines represent bonds.)

In the formula (1), a is a number of not smaller than 2, preferably a number of 2 to 12; b is a number of not smaller than 0, preferably a number of 1 to 998, more preferably a number of 5 to 500; c is a number of not smaller than 0, preferably a number of 0 to 10; d is a number of not smaller than 0, preferably a number of 0 to 5; a, b, c and d satisfy $2 \leq a+b+c+d \leq 1{,}000$, preferably $2 \leq a+b+c+d \leq 800$, more preferably $3 \leq a+b+c+d \leq 800$, even more preferably $4 \leq a+b+c+d \leq 500$. When a+b+c+d is larger than 1,000, the furanyl group-containing organopolysiloxane will exhibit a high viscosity, and a poor workability may thus be observed.

The molecular weight of the furanyl group-containing organopolysiloxane of the present invention is 500 to 40,000, preferably 1,000 to 20,000, more preferably 1,000 to 10,000, in terms of number average molecular weight. It is not preferable when such molecular weight is lower than 500, because properties derived from a (poly)siloxane, such as flexibility, may not be expressed; it is also not preferable when such molecular weight is higher than 40,000, because the furanyl group-containing organopolysiloxane will exhibit a high viscosity, and a poor workability may thus be observed. Here, the number average molecular weight is a value obtained via a GPC (gel permeation chromatography) analysis conducted under the following conditions, using polystyrene as a reference material.

[Measurement Conditions]

Developing solvent: tetrahydrofuran (THF)
Flow rate: 0.6 mL/min
Detector: differential refractive index detector (RI)
Column: TSK Guardcolumn Super H-H
TSKgel Super HM-N (6.0 mmI.D.×15 cm×1)
TSKgel Super H2500 (6.0 mmI.D.×15 cm×1)
(all by TOSOH CORPORATION)
Column temperature: 40 °C.
Sample injection volume: 50 μL (THF solution with a concentration of 0.3% by mass)

[Method for Producing Furanyl Group-Containing Organopolysiloxane]

A method for producing the furanyl group-containing organopolysiloxane of the present invention (may be abbreviated as "production method of the present invention" hereunder) has a step of reacting a "furan compound having at least one C—H bond" and a "hydrosilyl group-containing organopolysiloxane" under the presence of an "iridium complex" and a "hydrogen acceptor."

As a result of conducting a series of studies in search for a method for safely producing a furanyl group-containing organopolysiloxane without yielding a metal salt as a byproduct, the inventor of the present invention found that a furanyl group-containing organopolysiloxane was able to be directly synthesized via an oxidative coupling reaction between a furan compound and a hydrosilyl group-containing organopolysiloxane, utilizing an iridium complex and a hydrogen acceptor.

(Furan Compound Having at Least One C—H Bond)

The furan compound having at least one C—H bond is represented by the following general formula (4).

[Chemical formula 8]

(4)

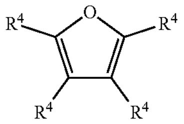

In the formula (4), each $R^4$ independently represents a group selected from a hydrogen atom, a halogen atom, a monovalent hydrocarbon group having 1 to 10 carbon atoms, an alkoxy group having 1 to 4 carbon atoms, and a hydroxyl group, in which at least one $R^4$ per molecule is a hydrogen atom. Examples of the halogen atom represented by $R^4$ include a fluorine atom, a chlorine atom, a bromine atom, and an iodine atom. Examples of the monovalent hydrocarbon group having 1 to 10 carbon atoms, which is also represented by $R^4$, include an alkyl group such as a methyl group, an ethyl group, a propyl group, and a butyl group; a cycloalkyl group such as a cyclopentyl group and a cyclohexyl group; and an aryl group such as a phenyl group and a tolyl group. Examples of the alkoxy group having 1 to 4 carbon atoms, which is also represented by $R^4$, include a methoxy group, an ethoxy group, a propoxy group, and a butoxy group. Among them, as $R^4$, preferred are a hydrogen atom and an alkyl group.

(Hydrosilyl Group-Containing Organopolysiloxane)

As the hydrosilyl group-containing organopolysiloxane, there may be used one represented by the following average composition formula (5).

[Chemical formula 9]

(5)

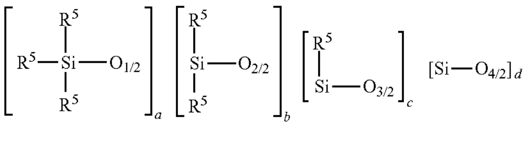

In the formula (5), each $R^5$ independently represents a group selected from a hydrogen atom, a monovalent hydrocarbon group having 1 to 10 carbon atoms, an alkoxy group having 1 to 4 carbon atoms, and a hydroxyl group, in which at least one $R^5$ per molecule is a hydrogen atom. a is a number of not smaller than 2, b is a number of not smaller than 0, c is a number of not smaller than 0, d is a number of not smaller than 0, and a, b, c and d satisfy $2 \leq a+b+c+d \leq 1,000$.

Examples of the monovalent hydrocarbon group having 1 to 10 carbon atoms, which is represented by $R^5$, include an alkyl group such as a methyl group, an ethyl group, a propyl group, and a butyl group; a cycloalkyl group such as a cyclopentyl group and a cyclohexyl group; and an aryl group such as a phenyl group and a tolyl group. Examples of the alkoxy group having 1 to 4 carbon atoms, which is also represented by $R^5$, include a methoxy group, an ethoxy group, a propoxy group, and a butoxy group. Among them, preferred are an alkyl group, a cycloalkyl group, and an aryl group; more preferred are a methyl group and a phenyl group.

(Iridium Complex)

There are no particular restrictions on the type of the iridium complex used in the production method of the present invention; a known iridium complex may be appropriately used. For example, as a ligand(s) coordinated to an iridium atom, there may be listed aromatic hydrocarbon compounds having structures of benzene, naphthalene and the like; hetero ring compounds having structures of thiophene, pyridine, pyrazine, pyrimidine, pyridazine, triazine, phenanthroline, thiazole, oxazole, pyrrole, imidazole, pyrazole, triazole and the like; hydrocarbon compounds having nitrogen-containing functional groups such as an alkylamino group, an arylamino group, an acylamino group, an alkoxycarbonylamino group, an aryloxycarbonylamino group, a sulfonylamino group, and an imino group; hydrocarbon compounds having oxygen-containing functional groups such as an alkoxy group, an aryloxy group, an acyloxy group, a silyloxy group, a carbonyl group, and an ether group; hydrocarbon compounds having sulfur-containing functional groups such as an alkylthio group, an arylthio group, and a thioether group; and hydrocarbon compounds having phosphorus-containing functional groups such as a dialkylphosphino group, a diarylphosphino group, trialkylphosphine, triarylphosphine, and phosphinine.

The ligands of the iridium complex used in the production method of the present invention are at least one compound selected from the group consisting of:

- an aromatic hydrocarbon compound that has 6 to 30, preferably 6 to 26, more preferably 10 to 24 carbon atoms;
- a hetero ring compound that has 2 to 30, preferably 2 to 16 carbon atoms;
- a hydrocarbon compound that contains a nitrogen-containing functional group, and has 1 to 30, preferably 3 to 16 carbon atoms;
- a hydrocarbon compound that contains an oxygen-containing functional group, and has 1 to 30, preferably 3 to 16 carbon atoms;
- a hydrocarbon compound that contains a sulfur-containing functional group, and has 1 to 30, preferably 3 to 20 carbon atoms; and
- a hydrocarbon compound that contains a phosphorus-containing functional group, and has 1 to 30, preferably 3 to 27 carbon atoms. Among these ligands, preferred are a hetero ring compound that has 2 to 30 carbon atoms, or a hydrocarbon compound that contains a phosphorus-containing functional group and has 1 to 30 carbon atoms; specifically, more preferred are 2-methyl-1,10-phenanthroline, 4,4'-di-tert-butylbipyridine (dtbpy), 2,2'-bipyridyl, and 1,3-bis(diphenylphosphino)propane (dppp).

There are no particular restrictions on the amount (mass) of the iridium complex used in the production method of the present invention; the amount thereof may be appropriately selected in accordance with an intended purpose. The iridium complex is preferably used in an amount of 100 to 20,000 ppm, more preferably 300 to 15,000 ppm, most preferably 500 to 10,000 ppm, with respect to the amount (mass) of the hydrosilyl group-containing organopolysiloxane used. The reaction can efficiently proceed if the amount of the iridium complex used is within the above ranges.

In the production method of the present invention, there are no particular restrictions on a method for preparing the iridium complex. Other than a method where the iridium complex is separately prepared by reacting a precursor containing iridium (may be abbreviated as "iridium-containing precursor” hereunder) and the ligand(s), the iridium complex may also be prepared in such a manner where the iridium-containing precursor and the ligand(s) are to be put into a reaction container for reacting the furan compound and the hydrosilyl group-containing organopolysiloxane so as to allow the iridium complex to be formed in such reaction container. For the sake of operational simplicity, it is preferred that the iridium complex be formed in the reaction container for reacting the furan compound and the hydrosilyl group-containing organopolysiloxane. Here, there are no particular restrictions on the type of the iridium-containing precursor; a commercially available product may be appropriately used. Specific examples thereof may include $[Ir(OMe)(cod)]_2$, $[Ir(OH)(cod)]_2$, $[IrCl(cod)]_2$, and $[Ir(OAc)(cod)]_2$ (in these formulae, cod represents 1,5-cyclooctadiene). Further, the amount (amount of substance [mol]) of the ligand(s) used when preparing the iridium complex is preferably 1 to 25 times, more preferably 5 to 20 times, most preferably 10 to 15 times larger than the amount (amount of substance [mol]) of the iridium-containing precursor used.

(Hydrogen Acceptor)

There are no particular restrictions on the type of the hydrogen acceptor used in the production method of the present invention so long as it is a substance capable of accepting two or more hydrogen atoms by a chemical reaction. A specific example of such hydrogen acceptor may be a carbon-carbon unsaturated bond-containing aliphatic hydrocarbon compound that is capable of accepting hydrogen atoms via an addition reaction, and has 2 to 20, preferably 2 to 10 carbon atoms. Specific examples of the carbon-carbon unsaturated bond-containing aliphatic hydrocarbon compound include cyclohexene, norbornene, 1-octene, trans-stilbene, 1,5-cyclooctadiene, phenylacetylene, and diphenylacetylene; it is preferred that one or more kinds of these aliphatic hydrocarbon compounds be used.

There are no particular restrictions on the amount (amount of substance [mol]) of the hydrogen acceptor used in the production method of the present invention; the amount thereof shall be appropriately selected in accordance with an intended purpose. The amount (amount of substance [mol]) of the hydrogen acceptor used is preferably 1 to 30 times, more preferably 2 to 7 times, most preferably 3 to 6 times larger than the amount (amount of substance [mol]) of the hydrosilyl group-containing organopolysiloxane used. The reaction can efficiently proceed if the amount of the hydrogen acceptor used is within the above ranges.

(Reaction Conditions)

In the production method of the present invention, there are no particular restrictions on reaction conditions such as a reaction temperature, a reaction time, and a solvent used.

The reaction temperature is preferably 25 to 200 °C, more preferably 70 to 150 °C, most preferably 80 to 100 °C. When the reaction temperature is within the above ranges, the furanyl group-containing organopolysiloxane can be efficiently produced.

The reaction time is preferably 1 to 60 hours, more preferably 2 to 48 hours, most preferably 4 to 24 hours.

While there may be used or not used a solvent, the use of a solvent is preferred if both the furan compound and the hydrosilyl group-containing organopolysiloxane are solid at the reaction temperature. There are no particular restrictions on the solvent used so long as it is capable of dissolving both the furan compound and the hydrosilyl group-containing organopolysiloxane, specific examples of which include tetrahydrofuran, decane, and octane.

WORKING EXAMPLES

The present invention is described in greater detail hereunder with reference to working examples; however, the present invention may be appropriately modified to the extent that the invention modified does not depart from the gist of the present invention. Thus, the scope of the present invention shall not be interpreted in a limited manner by the specific examples shown below.

$^1$H-NMR data listed in each working example were gathered via a measurement performed using AVANCE-III 400 MHz (by BRUKER Corporation), where heavy chloroform was used as a solvent, and TMS (tetramethylsilane) was used as a reference material. The values in the parentheses are integrated ratios.

Further, a number average molecular weight is a value obtained via a GPC (gel permeation chromatography) analysis conducted under the following conditions, using polystyrene as a reference material.

[Measurement Conditions]

Developing solvent: tetrahydrofuran (THF)

Flow rate: 0.6 mL/min

Detector: differential refractive index detector (RI)

Column: TSK Guardcolumn Super H-H

TSKgel Super HM-N (6.0 mmI.D.×15 cm×1)

TSKgel Super H2500 (6.0 mmID.×15 cm×1)

(all by TOSOH CORPORATION)

Column temperature: 40 °C.

Sample injection volume: 50 μL (THF solution with a concentration of 0.3% by mass)

Here, in the structural formulae listed in the following working examples, Me represents a methyl group.

Working Example 1

Here, 0.06 g of 2-methyl-1,10-phenanthroline, 6.44 g of 2-butylfuran, 3.41 g of cyclohexene, 5.00 g of tetrahydrofuran, and 50.00 g of an organopolysiloxane having a hydrosilyl group at both ends as represented by the following average formula (7), were put into a 100 mL separable flask equipped with a thermometer, a stirrer, a reflux condenser, and a nitrogen gas introduction tube. Next, 0.1 g of $[Ir(OMe)(cod)]_2$ were added thereto while performing stirring at 25 °C under a nitrogen atmosphere, and heating was conducted under reflux at 80 to 100 °C for 8 hours. Later, low-boiling-point substances were distilled away under a reduced pressure and at an inner temperature of 80 °C to obtain a brown transparent liquid with a yield of 92%. This product was confirmed to be a compound represented by the following average formula (8) via $^1$H-NMR, and the number average molecular weight thereof was 9,500. The $^1$H-NMR data of the compound represented by the average formula (8) are as follows.

0.07 ppm (930H), 0.91 ppm (6H), 1.34 ppm (4H), 1.58 ppm (4H), 2.63 ppm (4H), 5.94 ppm (2H), 6.57 ppm (2H)

[Chemical formula 10]

(7)

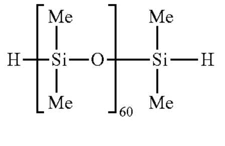

-continued

[Chemical formula 11]

(8)

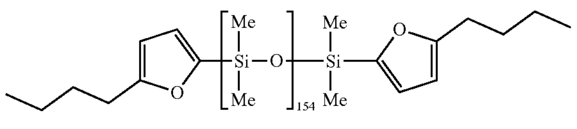

Working Example 2

Here, 0.06 g of 2-methyl-1,10-phenanthroline, 4.98 g of 2,5-dimethylfuran, 3.41 g of cyclohexene, 5.00 g of tetrahydrofuran, and 50.00 g of the organopolysiloxane having a hydrosilyl group at both ends as represented by the average formula (7), were put into a 100 mL separable flask equipped with a thermometer, a stirrer, a reflux condenser, and a nitrogen gas introduction tube. Next, 0.1 g of $[Ir(OMe)(cod)]_2$ were added thereto while performing stirring at 25 °C under a nitrogen atmosphere, and heating was conducted under reflux at 80 to 100 °C for 8 hours. Later, low-boiling-point substances were distilled away under a reduced pressure and at an inner temperature of 80 °C to obtain a brown transparent liquid with a yield of 95%. This product was confirmed to be a compound represented by the following average formula (9) via $^1H$-NMR, and the number average molecular weight thereof was 5,800. The $^1H$-NMR data of the compound represented by the average formula (9) are as follows.

0.07 ppm (600H), 2.23 ppm (6H), 2.31 ppm (6H), 5.82 ppm (2H)

[Chemical formula 12]

(9)

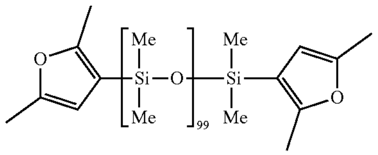

Working Example 3

Here, 0.03 g of 2-methyl-1,10-phenanthroline, 3.34 g of furan, 3.23 g of cyclohexene, 2.50 g of tetrahydrofuran, and 25.00 g of a branched organopolysiloxane having hydrosilyl groups at its ends as represented by the following average formula (10), were put into a 100 mL separable flask equipped with a thermometer, a stirrer, a reflux condenser, and a nitrogen gas introduction tube. Next, 0.05 g of $[Ir(OMe)(cod)]_2$ were added thereto while performing stirring at 25 °C under a nitrogen atmosphere, and heating was conducted under reflux at 80 to 100 °C for 8 hours. Later, low-boiling-point substances were distilled away under a reduced pressure and at an inner temperature of 80 °C to obtain a brown transparent liquid with a yield of 90%. This product was confirmed to be a compound represented by the following average formula (11) via $^1H$-NMR, and the number average molecular weight thereof was 3,500. The $^1H$-NMR data of the compound represented by the average formula (11) are as follows.

0.07 ppm (481H), 6.37 ppm (3H), 6.66 ppm (3H), 7.62 ppm (3H)

[Chemical formula 13]

(10)

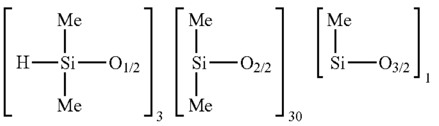

[Chemical formula 14]

(11)

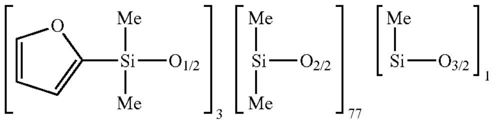

Comparative Example 1

Synthesis of Furanyl Group-Containing Organopolysiloxane Having Linker

In accordance with the examples disclosed in Patent document 1, there was synthesized a furanyl group-containing organopolysiloxane represented by the following average formula (12).

[Chemical formula 15]

(12)

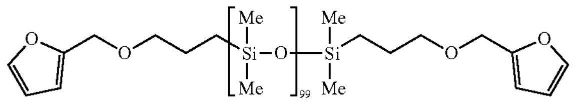

Comparative Example 2

Synthesis of Furanyl Group-Containing Asymmetric Siloxane

In accordance with the examples disclosed in Patent document 2, there was synthesized a furanyl group-containing asymmetric disiloxane represented by the following formula (13).

[Chemical formula 16]

(13)

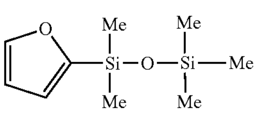

<Evaluation on Cationic Polymerizability>

Here, 1 part of concentrated sulfuric acid was added to 99 parts of each of the organo(poly)siloxanes that were obtained in the above working and comparative examples and are represented by the formulae (8), (9), (11), (12) and (13) to cause cationic polymerization under room temperature. The results thereof are shown in Table 1. Curability was evaluated based on the criteria shown below.

○: Cured, gel-like

Δ: Cured partially x: Did not cure, paste-like

TABLE 1

| | Furanyl group-containing organo(poly)siloxane | Curability |
|---|---|---|
| Working example 1 | Formula (8) | ○ |
| Working example 2 | Formula (9) | ○ |
| Working example 3 | Formula (11) | ○ |
| Comparative example 1 | Formula (12) | X |
| Comparative example 2 | Formula (13) | Δ |

As shown in Table 1, the furanyl group-containing organopolysiloxane of the present invention exhibited a superior cationic polymerizability.

The invention claimed is:

1. A method for producing a furanyl group-containing organopolysiloxane that is represented by the following average composition formula (1), and has a number average molecular weight of 500 to 40,000, (1)

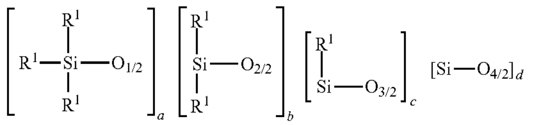

wherein each $R^1$ independently represents a group selected from a hydrogen atom, a monovalent hydrocarbon group having 1 to 10 carbon atoms, an alkoxy group having 1 to 4 carbon atoms, a hydroxyl group, and a furanyl group expressed by the following general formula (2) or (3), in which at least one $R^1$ per molecule is the furanyl group expressed by the following general formula (2) or (3); a is a number of 2 or greater, b is a number of 0 or greater, c is a number of 0 or greater, d is a number of 0 or greater, and a, b, c and d satisfy 2≤a+b+c+d≤1,000, (2)

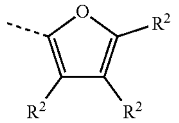

(3)

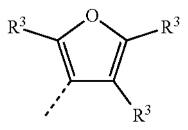

wherein each $R^2$ independently represents a group selected from a hydrogen atom, a halogen atom, a monovalent hydrocarbon group having 1 to 10 carbon atoms, an alkoxy group having 1 to 4 carbon atoms, and a hydroxyl group; each $R^3$ independently represents a group selected from a hydrogen atom, a halogen atom, a monovalent hydrocarbon group having 1 to 10 carbon atoms, an alkoxy group having 1 to 4 carbon atoms, and a hydroxyl group; the broken lines represent bonds, the method comprising a step of reacting (A) a furan compound represented by the following general formula (4), and (B) a hydrosilyl group-containing organopolysiloxane represented by the following average composition formula (5) under the presence of an iridium complex and a hydrogen acceptor, (4)

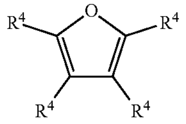

wherein each $R^4$ independently represents a group selected from a hydrogen atom, a halogen atom, a monovalent hydrocarbon group having 1 to 10 carbon atoms, an alkoxy group having 1 to 4 carbon atoms, and a hydroxyl group, in which at least one $R^4$ per molecule is a hydrogen atom, (5)

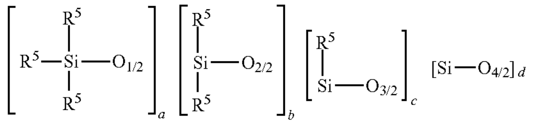

wherein each $R^5$ independently represents a group selected from a hydrogen atom, a monovalent hydrocarbon group having 1 to 10 carbon atoms, an alkoxy group having 1 to 4 carbon atoms, and a hydroxyl group, in which at least one $R^5$ per molecule is a hydrogen atom; a is a number of 2 or greater, b is a number of 0 or greater, c is a number of 0 or greater, d is a number of 0 or greater, and a, b, c and d satisfy 2≤a+b+c+d≤1,000, wherein the iridium complex is a complex whose ligands are at least one compound selected from the group consisting of: an aromatic hydrocarbon compound that has 6 to 30 carbon atoms; a hetero ring compound that has 2 to 30 carbon atoms; a hydrocarbon compound that contains a nitrogen-containing functional group, and has 1 to 30 carbon atoms; a hydrocarbon compound that contains an oxygen-containing functional group, and has 1 to 30 carbon atoms; a hydrocarbon compound that contains a sulfur-containing functional group, and has 1 to 30 carbon atoms; and a hydrocarbon compound that contains a phosphorus-containing functional group, and has 1 to 30 carbon atoms.

2. The method according to claim 1 for producing the furanyl group-containing organopolysiloxane, wherein the iridium complex is a hetero ring compound that has 2 to 30 carbon atoms, or a hydrocarbon compound that contains a phosphorus-containing functional group and has 1 to 30 carbon atoms.

3. The method according to claim 1 for producing the furanyl group-containing organopolysiloxane, wherein the hydrogen acceptor is a carbon-carbon unsaturated bond-containing aliphatic hydrocarbon compound that has 2 to 20 carbon atoms.

4. The method according to claim 1, wherein the furanyl group-containing organopolysiloxane has a number average molecular weight of 1,000 to 20,000.

5. The method according to claim 1, wherein d in the formula (1) is 0.

6. The method according to claim 1, wherein even c in the formula (1) is 0.

* * * * *